March 26, 1968  P. D. RODGERS ET AL  3,375,517
PHASE-CHANGE RATE DETECTOR
Filed Oct. 15, 1958
2 Sheets-Sheet 1
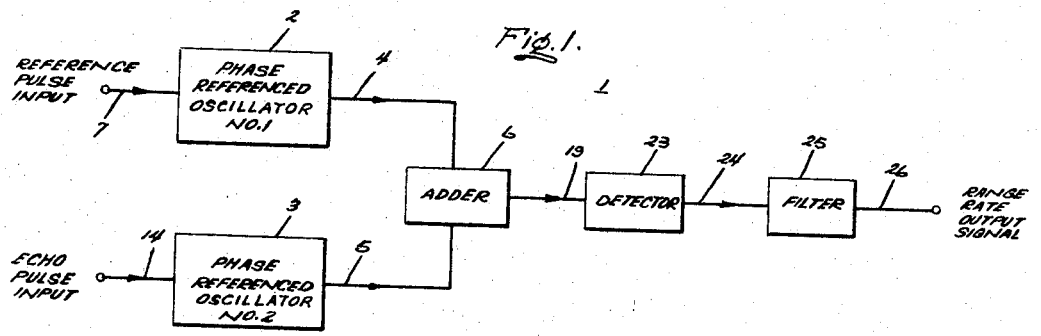
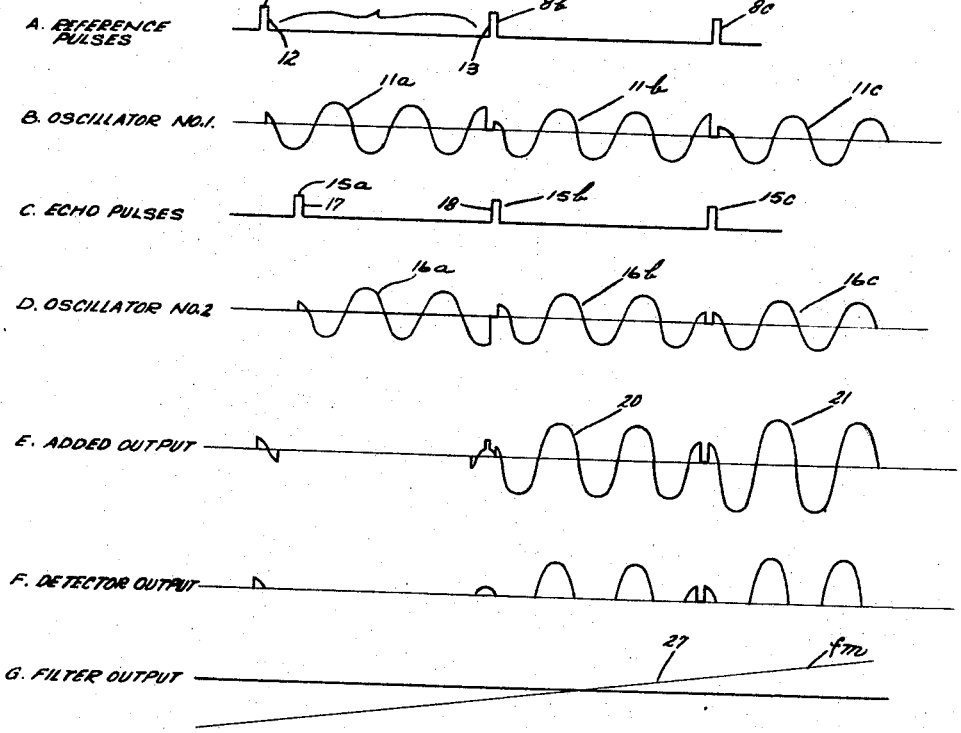
Inventors:
Paul D. Rodgers,
Bernard A. Beaulieu,
by Lust & Oish
Attorneys.

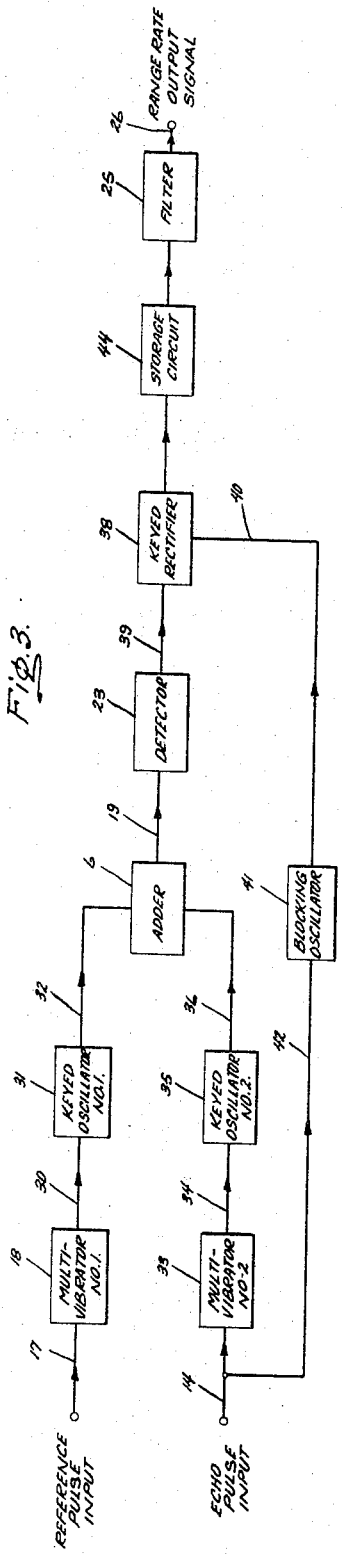
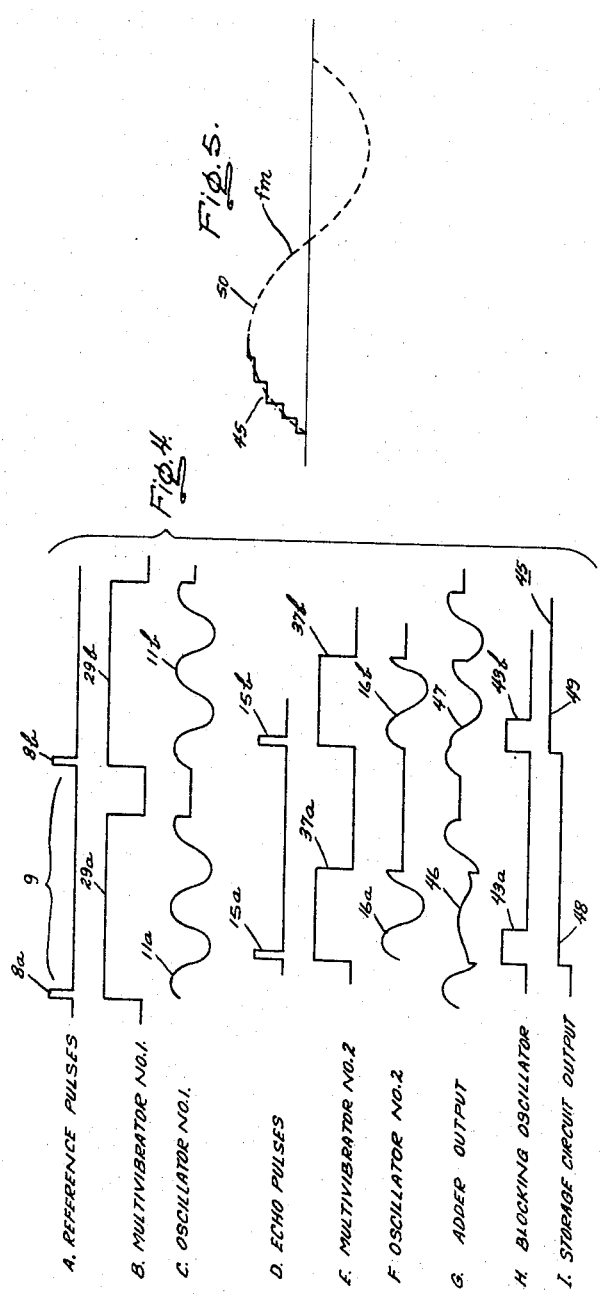

ative motion or phase-change if there is relative movement between the radar apparatus and the target. The outputs of these two oscillators are added together and the result-

United States Patent Office
3,375,517
Patented Mar. 26, 1968

3,375,517
PHASE-CHANGE RATE DETECTOR
Paul D. Rodgers and Bernard A. Beaulieu, Fort Wayne, Ind., assignors to International Telephone and Telegraph Corporation
Filed Oct. 15, 1958, Ser. No. 767,480
15 Claims. (Cl. 343—8)

This invention relates generally to a system for determining the rate of phase-change between periodically recurring pulses and other pulses respectively subject to phase-change relative to the periodic pulses, and finds particular utility in conjunction with pulsed radar apparatus for detecting range rate, i.e., target closure rate.

Pulsed radar apparatus in general use indicates the direction and range of remote objects, however, the rate of movement, i.e., target closure or range rate of such objects, is ordinarily determined only by time-consuming and relatively inaccurate integrating devices, if at all. Therefore, for timely warning of dangerous target closure conditions, it is desirable to provide a system for use with conventional radar equipment which will allow immediate and automatic indication of target closure or range rate.

Moving target indicator systems (MTI) are well known in the art, generally providing an indication that a target is moving with respect to a fixed point, but generally not indicating the rate of motion. In conventional MTI apparatus, the Doppler effect is utilized in that the phase of the RF carrier signal in the received echo pulse varies with respect to the transmitted carrier phase as succeeding echo pulses are received from the moving target. Various pulse-Doppler techniques are also known for measuring both range and target closure rate in a single system. However, the pulse Doppler method is an entire radar system concept and the apparatus employing it is exceedingly complex. It is therefore further desirable to provide a target closure rate detecting system which may be employed in conjunction with or added to conventional pulsed radar equipment, and it is further desirable that such a system be characterized by its simplicity and that it provide a high degree of resolution throughout a wide range of closure rates.

It is accordingly an object of our invention to provide an improved system for determining the rate of phase-change between first periodically recurring pulses and other pulses respectively subject to phase-change relative to the first pulses.

Another object of our invention is to provide an improved system for determining target closure rate in radar apparatus.

A further object of our invention is to provide an improved system for determining target closure rate which can readily be applied to existing pulsed radar apparatus and which is simpler than prior systems known to the present applications for providing such information.

We have found that by separately phase-locking two oscillators to separate timing pulse trains which have relative motion and adding the two oscillator outputs together, the resulting signal has a frequency content which is directly proportional to such relative motion. Thus, in accordance with the broader aspects of our invention as applied to pulsed radar apparatus, we provide two oscillators operating at approximately the same frequency, these oscillators being respectively phase synchronized by the two pulse trains, one being a reference pulse train in time coincidence with the transmitted pulses of the radar apparatus and the other being the echo pulse train received by the radar apparatus, or pulses in time coincidence therewith; these two pulse trains have relative motion or phase-change if there is relative movement between the radar apparatus and the target. The outputs of these two oscillators are added together and the resulting waveform is detected. Thus, if the phase angle between the two oscillator outputs is continuously changing, as will be the case with a moving target, the output of the adder will describe a waveform, the frequency of which is dependent upon the rate of motion between the reference and echo pulse trains.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a schematic illustration of one embodiment of our invention for providing range rate information in a pulsed radar system;

FIG. 2 shows a series of waveforms useful in explaining the operation of the system of FIG. 1;

FIG. 3 is another schematic illustration showing the preferred embodiment of our invention;

FIG. 4 is another series of waveforms useful in explaining the operation of the system of FIG. 3; and FIG. 5 shows a waveform of the output signal from the system of FIG. 3.

Referring now to FIGS. 1 and 2, one embodiment of our improved target closure or range rate detecting system, generally identified as 1, includes two oscillators 2 and 3 respectively having their output circuits 4 and 5 connected to the input circuits of a conventional adding circuit 6. Oscillators 2 and 3, which provide approximately the same but not necessarily exactly identical frequency outputs, may be of any type well known in the art in which their oscillation is initiated and terminated in response to an externally applied signal. Thus, in the specific embodiment of FIG. 2, oscillators 2 and 3 may be of the type which are normally free-running, but which are blocked, i.e., have their oscillation terminated responsive to application of a pulse.

Oscillator 2 thus has an input circuit 7 for connection to a source of reference pulses 8 which are in time coincidence with the transmitted pulses of the radar apparatus with which the system 1 is employed. Reference pulses 8 thus have a constant PRF 9, each reference pulse 8 momentarily blocking the oscillation of the oscillator 2. Thus, as shown in FIG. 2(B), oscillator 2 may be said to have its sine wave output 11 initiated by the trailing edge 12 of each reference pulse 8 and terminated by the leading edge 13 of the next successive reference pulse, oscillator 2 thus being free-running to provide its sine wave output 11 during the interval intermediate the reference pulses 8.

Oscillator 3 is preferably identical to oscillator 2 and thus likewise has an input circuit 14 for receiving the echo pulses which are received by the radar apparatus; it will be readily understood that either the actual echo pulses or pulses in time coincidence therewith may be employed. As shown in FIG. 2(C), the echo pulses 15a, 15b and 15c do not have the same PRF as the reference pulses in instances when a moving target is being observed by the radar apparatus; for a constant target closure rate, the PRF of the echo pulses 15 will be constant, but different from PRF 9 of reference pulses 8. Oscillator 3 functions in a manner identical to the oscillator 2, i.e., its sine wave output 16 is blocked by each echo pulse 15 and thus it can be said that the trailing edge 17 of each echo pulse 15 initiates the oscillation of oscillator 3 and that the leading edge 18 of the next successive echo pulse 15 terminates the oscillation 16.

Referring now to FIG. 2(E), it will be observed that the echo pulse 15a has a time delay or phase relationship with respect to the reference pulse 8a so that the sine wave output 16a of the oscillator 3 is 180° out of phase with respect to the sine wave output 11a of oscillator 2.

Thus, it will be readily understood that no signal will be provided in the output circuit 19 of adder circuit 6 as long as this condition prevails (assuming that the oscillation 11 and 16 are of equal amplitude). It will further be observed, however, that the next echo pulse 15b following the first echo pulse 15a has changed its time delay or phase relationship with respect to its corresponding reference pulse 8d so that the sine wave output 16b from oscillator 3 when added to the sine wave output 11b from oscillator 2 in the adder circuit 6 provides a resulting added signal 20 in output circuit 19 of the adder circuit 6. Likewise, it will be observed that echo pulse 15c is shown to be in phase with reference pulse 8c so that sine wave output 16c of oscillator 3 and sine wave output 11c of oscillator 2 are in phase, or time coincidence, thus providing a maximum output signal 21 in output circuit 19 of adding circuit 6. It will now be observed that the resutling added signal in the output circuit 19 of the adding circuit 6 varies in amplitude responsive to the phase displacement between the sine wave output 16 of oscillator 3 and the sine wave output 11 of oscillator 2, this phase displacement in turn being responsive to the time delay or phase displacement between the echo pulses 15 and the reference pulses 8.

An envelope detector 23, such as a diode detector, is provided connected to the output circuit 19 of the adding circuit 6 which thus detects the envelope defined by the variable amplitude signal 20, 21 provided by the adder circuit 6, as shown in FIG. 2(F). The output circuit 24 of envelope detector 23 is then connected to an appropriate filter 25 which in turn is connected to output circuit 26 and it will be readily understood that there will thus be provided in the output circuit 26 a signal 27 having a frequency $f_m$ directly proportional to the rate of change of the phase displacement between the sine wave output 16 and 11 of the oscillators 3 and 2 and thus in turn directly proportional to the rate of change of the time delay or phase relation between echo pulses 15 and reference pulses 8, i.e., the target closer or range rate; it will be readily understood that if the target is not moving, the echo pulses 15 will bear a fixed time delay or phase relationship with respect to the reference pulses 8 and thus the output signal in the output circuit 19 of adder circuit 6 will have a constant amplitude so that no envelope will be detected by the detector 23 thereby providing no output signal in the output circuit 26. It is thus seen that the output signal of the adder circuit 6 is step-modulated, the number of steps per modulation cycle being determined by the ratio of the PRF 9 to the modulating frequency, the modulating frequency being determined by the target closure rate, this step modulated CW signal being detected by detector 23 and filtered by the filter 25 to produce a sine wave signal whose frequency is directly proportional to the target closure or range rate.

Referring now to FIGS. 3, 4 and 5 in which the preferred emmodiment of our invention is shown, like elements will be indicated by like reference numerals. Here, input circuits 7 and 14 are again adapted to be respectively connected to a source of reference pulses which are in time coincidence with the transmitted pulses of the radar apparatus and to the source of received echo pulses or pulses in time coincidence therewith. Input circuit 17 in this embodiment is connected to a conventional monostable multivibrator 18 which thus provides a gate pulse 29 responsive to each reference pulse 8, gate pulse 29 having a duration shorter than the interval between successive reference pulses. The output circuit 30 of multivibrator 18 is connected to a conventional keyed oscillator 31 which has its output circuit 32 connected to the adding circuit 6. Oscillator 31 which provides the sine wave signal 11 in its output circuit 32 is here of the type which has its oscillation initiated by the leading edge of gate pulse 29 and terminated by the trailing edge. Thus, as is well known in the art, oscillator 31 may be of the Colpitts type having a damping tube shunting the tuned circuit, this damping tube being arranged so that under normal conditions it is biased to prevent oscillation, the gate pulses 29 removing the bias thus permitting oscillator 31 to oscillate for the duration of the gate pulses 29.

The echo pulse input circuit 14 is likewise connected to another monostable multivibrator 33 which in turn has its output circuit 34 connected to another keyed oscillator 35, preferably identical to the oscillator 31 and providing a frequency which is approximately the same but not necessarily exactly identical to the frequency provided by the oscillator 31. Oscillator 35 in turn has its output circuit 36 connected to the adding circuit 6. Each echo pulse 15 impressed on the monostable multivibrator 33 causes it to provide a gate pulse 37, gate pulses 37 being of shorter duration than the gate pulses 29 from the monostable multivibrator 18. Gate pulses 37 when impressed upon the oscillator 35 likewise cause it to oscillate to provide its sine wave output 16. The output circuit 19 of adder circuit 6 is again connected to the envelope detector 23.

Reference to FIG. 4(G) will now indicate that the sine wave output signal 16 from the echo oscillator 35 is impressed on the adder circuit 6 for a shorter period of time than is the sine wave output 11 from the reference oscillator 31. Here again, however, during the period of simultaneous impression of sine wave output signals 11 and 16 on the adding circuit 6, the output signal in output circuit 19 will have its amplitude directly proportional to the phase displacement between the sine wave signals 11 and 16 of oscillators 31 and 35, the envelope defined by the added signals being responsive to the rate of phase-change between signals 11 and 16 and thus the rate of movement or phase-change between the reference pulses 8 and respectively corresponding echo pulses 15.

In the present embodiment, a keyed or gated rectifier or detector 38 is provided, which may be of the type commonly referred to as a "boxcar" detector, the keyed rectifier 38 having its signal input circuit coupled to the output circuit 39 of envelope detector 23 and having its keying or gating input circuit 40 connected to the output circuit of a conventional blocking oscillator 41, which in turn has its input circuit 42 connected to the echo pulse input circuit 14. Blocking oscillator 41 thus provides gate pulses 43 responsive to each echo pulse 15, the gate pulses 43 being still shorter in duration than the gate pulses 37 from the multivibrator 33. Impression of each gate pulse 43 upon the keyed rectifier 38 thus passes a sample of the detected signal in the output circuit 39 of detector 23.

The output of keyed rectifier 38 is impressed upon a suitable storage circuit 44, which may be a simple condenser connected across the output of keyed rectifier 38, as is well known in the art. Thus, as shown in FIG. 4(I), the sample of the envelope detected by detector 23 passed by the keyed rectifier 38 during the impression of gate pulses 43 theron is stored in the storage circuit 44 until the next pulse arrives. Storage circuit 44 is in turn connected to filter 25 which is connected to the output circuit 26. It will now be seen that the output of the keyed rectifier 38 and storage circuit 44 is a stair-stepped waveform 45 which defines a sinusoidal wave form, the frequency $f_m$ of which is directly responsive to the rate of change of the phase displacement between the output waveforms 11 and 16 of reference and echo oscillators 31 and 35 which in turn are responsive to the rate of change of the time delay or phase displacement between the reference and echo pulses 8 and 15, thus providing a direct indication of target closure or range rate.

Referring now briefly again to FIG. 4, it will be seen that the indicated phase displacement or time delay of echo pulse 15a with respect to reference pulse 8a provides the phase displacement between sinewave signals 16a and 11a shown thereby providing in the output circuit 19 of adder circuit 6 a signal 46 having the amplitude shown. It is here assumed that the target is closing and thus it will be seen that the next echo pulse 15 has a smaller time delay and thus smaller phase displacement with respect to the next reference pulse 8b so that the added sine wave signals 16 and 11 in the adding circuit 6 have a greater amplitude, as shown at 47. The sample of the envelope of signal 46 detected by detector 23 and passed by the keyed rectifier 38 responsive to gate pulse 43a thus provides a level 48 in the storage circuit 44 whereas the sample of the detected envelope of signal 47 provided by gate pulse 43a provides a stored level 49, these stair-stepped levels providing the output wave form 50 shown in FIG. 5 from the filter 25.

We have found that while a difference in the frequency outputs of the two oscillators has no effect on the frequency $f_m$ in the output of the device, it does effect the amplitude of the output signal, resulting in zero amplitude points at difference frequencies of 1 PRF, 2 PRF . . . n PRF cycles. Thus, the difference frequency of the two oscillators is preferably maintained within .5 PRF cycle.

It will now be readily seen that we have provided an extremely simple target closure or range rate detector system which is triggered by reference and echo radar pulses and which provides a sine wave frequency directly proportional to the target closure or range rate. It will further be observed that the process utilized is not continuous, which distinguishes it from the conventional CW Doppler system, since the reference and echo oscillators are reset each pulse period. It will further be seen that our improved system is readily added to conventional pulsed radar apparatus. It will further be seen that our system may be employed for determining the rate of phase-change between any periodically recurring pulses, and other pulses which are subject to phase change relative to the periodic pulses. Thus, our system may be employed in a phase-rate meter in which, for example, it may be desired accurately to measure the rate of phase-change of a CW signal as it passes through a network or electronic circuit. Thus, in such a system, a pulse may be generated, as is well known in the art, from each sine wave of the input circuit to provide the reference pulse with a similar operation being performed on the output signal to provide an error or echo pulse, these two pulse inputs then being applied to the systems as described hereinabove to indicate the rate of phase-change of the signal as it passes through the circuit or network.

While we have described above the principles of our invention in connection with specific apparatus, it is to be clearly understood that this description is made only by way of example and not as a limitation to the scope of our invention.

What is claimed is:

1. A system for determining the rate of phase change between first periodically recurring pulses and second pulses respectively subject to phase change relative to said first pulses comprising: first oscillator means including means for phase-synchronizing the same by said first pulses; second oscillator means including means for phase-synchronizing the same by said second pulses; and means coupled in common to the output of said first and second oscillator means to provide a signal indicative of said rate of phase change.

2. A system for determining the rate of phase change between first periodically recurring pulses and second pulses respectively subject to phase change relative to said first pulses comprising: first oscillator means including means for phase-synchronizing the same by said first pulses; second oscillator means including means for phase-synchronizing the same by said second pulses; means for adding the output signals of said first and second oscillators; and means coupled to the output of said adding means to provide a signal indicative of said rate of phase change.

3. A system for determining the rate of phase change between first periodically recurring pulses and second pulses respectively subject to phase change relative to said first pulses comprising: first oscillator means including means for phase-synchronizing the same by said first pulses; second oscillator means including means for phase-synchronizing the same by said second pulses; means for adding the output signals of said first and second oscillators; means for detecting the output signal from said adding means; and means for filtering the output signal from said detecting means to provide a signal indicative of said rate of phase change.

4. A system for determining the rate of phase change between first periodically recurring pulses and second pulses respectively subject to phase change relative to said first pulses comprising: a first input circuit for connection to the source of said first pulses; first oscillator means coupled to said first input circuit for providing a first train of oscillations responsive to each of said first pulses; a second input circuit for connection to the source of said second pulses; second oscillator means coupled to said second input circuit for providing a second train of oscillations responsive to each of said second pulses, said first and second oscillators having approximately the same frequency; an adding circuit coupled to said first and second oscillators for adding said first and second oscillations; detector means coupled to said adding circuit for detecting the output signal from said adding circuit thereby providing a signal component the frequency of which varies responsive to said rate of phase change; and means coupled to said detector means responsive to said signal component to provide a signal indicative of said rate of phase change.

5. A system for determining the rate of phase change between first periodically recurring pulses and second pulses respectively subject to phase change relative to said first pulses comprising: a first input circuit for receiving said first pulses; a first oscillator having an output circuit for providing a first sinewave output signal, said first input circuit being coupled to said first oscillator whereby oscillation thereof is initiated responsive to each of said first pulses; a second input circuit for receiving said second pulses; a second oscillator having an output circuit for providing a second sinewave output signal having approximately the same frequency as said first output signal, said second input circuit being coupled to said second oscillator whereby oscillation thereof is initiated responsive to each of said second pulses; an adding circuit coupled to said first and second oscillator output circuits for adding said first and second output signals to provide a signal having an amplitude responsive to the phase relationship of said first and second signals; a detector coupled to said adding circuit for detecting said last-named signal; and a filter circuit coupled to said detector whereby a signal is provided having a frequency responsive to the rate of change of the phase displacement of said first and second output signals.

6. In a pulsed radar system, a range rate detecting circuit comprising: a first input circuit for receiving first pulses in time coincidence with the pulses transmitted by said system; a first oscillator having an output circuit for providing a first sinewave output signal, said first input circuit being coupled to said first oscillator whereby oscillation thereof is initiated responsive to each of said first pulses; a second input circuit for receiving the echo pulses received by said system; a second oscillator having an output circuit for providing a second sinewave output signal having approximately the same frequency as said first output signal, said second input circuit being coupled to said second oscillator whereby oscillation thereof is initiated responsive to each of said echo pulses; an adding circuit coupled to said first and second oscillator output circuits for adding said first and second output signals to provide a signal having its amplitude responsive to the phase relationship of said first and second output signals; a detector circuit coupled to said adding circuit for detecting the envelope of said last-named signal; and a filter circuit coupled to said detector whereby a range rate signal is provided having a frequency responsive to the rate of change of the time delay between said first and echo pulses.

7. A system for determining the rate of phase change between first periodically recurring pulses and second pulses respectively subject to phase change relative to said first pulses comprising: first oscillator means; means responsive to each of said first pulses for initiating oscillation of said first oscillator means and for terminating oscillation thereof prior to the next succeeding one of said first pulses; second oscillator means, means responsive to each of said second pulses for initiating oscillation of said second oscillator means and for terminating oscillation thereof prior to the next succeeding one of said second pulses; adding means for adding the outputs of said first and second oscillator means; and detector means for detecting the output signal from said adding means.

8. A system for determining the rate of phase change between first periodically recurring pulses and second pulses respectively subject to phase change relative to said first pulses comprising: a first input circuit for receiving said first pulses; means coupled to said first input circuit for providing a first gate pulse responsive to each of said first pulses, each of said first gate pulses being of shorter duration than the interval between said first pulses; first oscillator means coupled to said first gate pulse means for providing a first signal responsive thereto; a second input circuit for receiving said second pulses; means coupled to said second input circuit for providing a second gate pulse responsive to each of said second pulses, each of said second gate pulses being of shorter duration than the interval between said second pulses; second oscillator means coupled to said second gate pulse means for providing a second signal responsive thereto and having approximately the same frequency as said first signal; adding circuit means coupled to said first and second oscillator means for adding said first and second signals; detector circuit means coupled to said adding circuit for detecting the output signal therefrom; and filter means coupled to said detector circuit means whereby an output signal is provided having a frequency responsive to the rate of change of the phase displacement of said first and second signals.

9. A system for determining the rate of phase change between first periodically recurring pulses and second pulses respectively subject to phase change relative to said first pulses comprising: a first input circuit for receiving said first pulses; means coupled to said first input circuit for providing a first gate pulse responsive to each of said first pulses, each of said first gate pulses being of shorter duration than the interval between said first pulses; first oscillator means coupled to said first gate pulse means for providing a first signal responsive thereto; a second input circuit for receiving said second pulses; means coupled to said second input circuit for providing a second gate pulse responsive to each of said second pulses, each of said second gate pulses being of shorter duration than the interval between said second pulses; second oscillator means coupled to said second gate pulse means for providing a second signal responsive thereto and having approximately the same frequency as said first signal; adding circuit means coupled to said first and second oscillator means for adding said first and second signals; detector circuit means coupled to said adding circuit for detecting the output signal therefrom; means coupled to said second input circuit for providing another gate pulse responsive to each of said second pulses and shorter than said second gate pulses; gate means coupled to said detector circuit means and said other gate pulse means for passing the output signal from said detector circuit means responsive to said other gate pulses; storage means coupled to said gate means for storing each output signal level therefrom; and filter means coupled to said storage means whereby an output signal is provided having a frequency responsive to the rate of change of the phase displacement of said first and second signals.

10. A system for determining the rate of phase change between first periodically recurring pulses and second pulses respectively subject to phase change relative to said first pulses comprising: a first input circuit for receiving said first pulses; first monostable multivibrator means coupled to said first input circuit for providing a first gate pulse responsive to each of said first pulses, each of said first gate pulses being of shorter duration than the interval between said first pulses; a first keyed oscillator coupled to said first mutlivibrator means for providing a first signal responsive to said first gate pulses; a second input circuit for receiving said second pulses; second monostable multivibrator means coupled to said second input circuit for providing a second gate pulse responsive to each of said second pulses, said second gate pulses being of shorter duration than said first gate pulses; a second keyed oscillator coupled to said second multivibrator means for providing a second signal responsive to said second gate pulses and having approximately the same frequency as said first signal; an adding circuit coupled to said first and second oscillators for adding said first and second signals; a detecting circuit coupled to said adding circuit for detecting the envelope of the output signal thereof; and a filter circuit coupled to said detector circuit whereby an output signal is provided having a frequency responsive to the rate of change of the phase displacement of said first and second signals.

11. A system for determining the rate of phase change between first periodically recurring pulses and second pulses respectively subject to phase change relative to said first pulses comprising: a first input circuit for receiving said first pulses; first monostable multivibrator means coupled to said first input circuit for providing a first gate pulse responsive to each of said first pulses, each of said first gate pulses being of shorter duration than the interval between said first pulses; a first keyed oscillator coupled to said first multivibrator means for providing a first signal responsive to said first gate pulses; a second input circuit for receiving said second pulses; second monostable multivibrator means coupled to said second input circuit for providing a second gate pulse responsive to each of said second pulses, said second gate pulses being of shorter duration than said first gate pulses; a second keyed oscillator coupled to said second multivibrator means for providing a second signal responsive to said second gate pulses and having approximately the same frequency as said first signal; an adding circuit coupled to said first and second oscillators for adding said first and second signals; a detecting circuit coupled to said adding circuit for detecting the envelope of the output signal thereof; a blocking oscillator coupled to said second input circuit for providing another gate pulse responsive to each of said second pulses, said other gate pulses being a shorter duration than said second gate pulses; a keyed rectifier circuit coupled to said detecting circuit and to said blocking oscillator for providing a sample of the detected output of said detecting circuit responsive to said other gate pulses; storage means coupled to said keyed rectifier circuit for storing the level of each sample therefrom; and a filter circuit coupled to said storage means whereby an output signal is provided having a frequency responsive to the rate of change of the phase displacement of said first and second signals.

12. In a pulsed radar system, a range rate detecting circuit comprising: a first input circuit for receiving first pulses in time coincidence with the pulses transmitted by said system; first monostable multivibrator means coupled to said first input circuit for providing a first gate pulse responsive to each of said first pulses, each of said first gate pulses being of shorter duration than the interval between said first pulses; a first keyed oscillator having an output circuit for providing a first sinewave output signal, said first multivibrator being coupled to said first oscillator whereby oscillation thereof is initiated responsive to said first gate pulses; a second input circuit for receiving the echo pulses received by said system; second monostable multivibrator means coupled to said second input circuit for providing a second gate pulse responsive to each of said echo pulses, said second gate pulses being of shorter duration than said first gate pulses; a second keyed oscillator having an output circuit for providing a second sinewave output signal, said second multivibrator being coupled to said second oscillator whereby oscillation thereof is initiated responsive to said second gate pulses, said first and second oscillators having approximately the same frequency; an adding circuit coupled to said first and second oscillator output circuits for adding said first and second output signals to provide a signal having an amplitude responsive to the phase relationship of said first and second output signals; a detector circuit coupled to said adding circuit for detecting the envelope of the output signal thereof; a blocking oscillator coupled to said second input circuit for providing another gate pulse responsive to each of said echo pulses, said other gate pulses being of shorter duration than said second gate pulses; a keyed rectifier circuit coupled to said detector circuit and to said blocking oscillator for providing a sample of the detected output of said detector circuit responsive to said gate pulses; storage means coupled to said keyed rectifier circuit for storing the level of each sample therefrom; and a filter circuit coupled to said storage means whereby a range rate signal is provided having a frequency responsive to the rate of change of the time delay between said first and echo pulses.

13. A system for determining the rate of phase change between first periodically recurring pulses and second pulses respectively subject to phase change relative to said first pulses comprising: first oscillator means including means for blocking the same responsive to each of said first pulses; second oscillator means including means for blocking the same responsive to each of said second pulses; adding means for adding the outputs of said first and second oscillator means; and detector means for detecting the output signal from said adding means.

14. A system for determining the rate of phase change between first periodically recurring pulses and second pulses respectively subject to phase change relative to said first pulses comprising: a first input circuit for receiving said first pulses; first oscillator means coupled to said first input circuit for providing a first signal, said first signal being initiated responsive to the trailing edge of each of said first pulses and terminated responsive to the leading edge of the next successive first pulse; a second input circuit for receiving said second pulses; second oscillator means coupled to said second input circuit for providing a second signal, said second signal being initiated responsive to the trailing edge of each of said second pulses and terminated responsive to the leading edge of the next successive second pulse, said first and second oscillator means having approximately the same frequency; an adding circuit coupled to said first and second oscillator means for adding said first and second signals; a detecting circuit coupled to said adding circuit for detecting the envelope of the output signal therefrom; and a filter circuit coupled to said detecting circuit whereby an output signal is provided having a frequency responsive to the phase difference in said oscillator signals.

15. In a pulsed radar system, a range rate detecting circuit comprising: a first input circuit for receiving first pulses in time coincidence with the pulses transmitted by said system; a first phase referenced oscillator having an output circuit for providing a first sinewave signal said first oscillator being coupled to said first input circuit and including means for blocking the same responsive to each of said first pulses whereby said first signal is initiated responsive to the trailing edge of each of said first pulses and terminated responsive to the next successive one of said first pulses; a second input circuit for receiving the echo pulses received by said system; a second phase referenced oscillator having an output circuit for providing a second sinewave signal, said second oscillator being coupled to said second input circuit and including means for blocking the same responsive to each of said echo pulses whereby said second signal is initiated responsive to the trailing edge of each of said echo pulses and terminated responsive to the next successive one of said echo pulses; an adding circuit coupled to said first and second oscillator output circuits for adding said first and second output signals to provide a signal having an amplitude responsive to the phase relationship of said first and second output signals; a detector circuit coupled to said adding circuit for detecting the envelope of said last-named signal; and a filter circuit coupled to said detector whereby a range rate signal is provided having a frequency responsive to the rate of change of the time delay between said first and echo pulses.

References Cited
UNITED STATES PATENTS 2,422,074  6/1947  Bond _____ 343—8
2,517,805  8/1950  Spindler _____ 328—133

RODNEY D. BENNETT, *Primary Examiner.*

FREDERICK M. STRADER, CHESTER L. JUSTUS, RICHARD A. FARLEY, *Examiners.*

C. L. WHITHAM, *Assistant Examiner.*